US011814055B2

(12) United States Patent
Zhou et al.

(10) Patent No.: US 11,814,055 B2
(45) Date of Patent: Nov. 14, 2023

(54) DIRECTION DETECTION USING A WHEEL SPEED SENSOR AND EXCITER RING

(71) Applicant: Bendix Commercial Vehicle Systems LLC, Elyria, OH (US)

(72) Inventors: Nianqing Zhou, Avon, OH (US); Shu Yan Liu, Calgary (CA); Daniel P Zula, North Ridgeville, OH (US); Thomas J Hayes, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 394 days.

(21) Appl. No.: 17/349,334

(22) Filed: Jun. 16, 2021

(65) Prior Publication Data

US 2022/0402507 A1    Dec. 22, 2022

(51) Int. Cl.
*B60W 40/10* (2012.01)
*G01P 21/02* (2006.01)
(Continued)

(52) U.S. Cl.
CPC ............ *B60W 40/10* (2013.01); *B60T 8/171* (2013.01); *G01P 21/02* (2013.01); *B60T 8/172* (2013.01);
(Continued)

(58) Field of Classification Search
None
See application file for complete search history.

(56) References Cited

U.S. PATENT DOCUMENTS 5,487,595 A * 1/1996 Wise .................. B60T 8/885
                                               701/70
5,789,658 A * 8/1998 Henn .................. G01P 21/02
                                               73/114.25
(Continued)

FOREIGN PATENT DOCUMENTS

CN    115071726 A  *  9/2022
CN    115257777 A  * 11/2022
(Continued)

OTHER PUBLICATIONS

European Patent Office, "International Search Report and Written Opinion," Report, dated Oct. 18, 2022, 13 pages, European Patent Office Rijswijk Netherlands.

*Primary Examiner* — Kevin R Steckbauer
(74) *Attorney, Agent, or Firm* — Cheryl L. Greenly; Brian E. Kondas

(57) ABSTRACT

A system for determining vehicle direction includes an active wheel speed sensor (aWSS), an exciter ring for inducing a change in a signal from the aWSS and a controller. The controller receives a first series of signals from the aWSS, compares them to an array of predefined signals and determines the direction of travel based on the first series of signals matching the array. The controller receives a second series of signals and determines the exciter ring has an anomaly in response to at least one signal in the second series of signals having a first variance. The controller updates the array of predefined signals to include a representation of the first variance to create an array of updated signals. The controller determines the direction of travel based on a subsequent series of signals matching one of the array of predefined signals and the array of updated signals.

17 Claims, 12 Drawing Sheets

(51) Int. Cl.
  *B60T 8/171*   (2006.01)
  *B60W 50/00*   (2006.01)
  *G01P 13/04*   (2006.01)
  *B60T 8/172*   (2006.01)
(52) U.S. Cl.
  CPC ............... *B60T 2270/416* (2013.01); *B60W 2050/0043* (2013.01); *B60W 2420/503* (2013.01); *B60W 2520/28* (2013.01); *B60W 2720/24* (2013.01); *G01P 13/04* (2013.01)

(56) References Cited

U.S. PATENT DOCUMENTS

| | | | | |
|---|---|---|---|---|
| 5,864,775 | A * | 1/1999 | Bradshaw | F02D 41/0097 |
| | | | | 73/114.25 |
| 6,525,529 | B2 * | 2/2003 | Murai | G01D 5/24461 |
| | | | | 324/225 |
| 7,116,096 | B2 * | 10/2006 | Waszkowski | G01P 13/04 |
| | | | | 324/179 |
| 8,467,929 | B2 * | 6/2013 | Bechtler | B60T 8/885 |
| | | | | 73/1.37 |
| 11,262,375 | B2 * | 3/2022 | Zula | G01P 13/045 |
| 2002/0125880 | A1 * | 9/2002 | Murai | G01P 3/488 |
| | | | | 702/145 |
| 2008/0173079 | A1 * | 7/2008 | McGee | G01P 13/045 |
| | | | | 73/114.26 |
| 2011/0025307 | A1 * | 2/2011 | Koski | G01P 13/045 |
| | | | | 324/207.2 |
| 2011/0066319 | A1 * | 3/2011 | Bechtler | B60T 8/885 |
| | | | | 701/29.2 |
| 2013/0289933 | A1 * | 10/2013 | Hess | G01P 21/02 |
| | | | | 702/145 |
| 2018/0031594 | A1 * | 2/2018 | Joseph | G01P 3/44 |
| 2021/0181228 | A1 * | 6/2021 | Zula | G01P 3/44 |
| 2022/0402507 | A1 * | 12/2022 | Zhou | B60T 8/171 |

FOREIGN PATENT DOCUMENTS

| | | | | |
|---|---|---|---|---|
| DE | 19602359 | A1 * | 7/1997 | ............... B60T 8/171 |
| DE | 19540674 | C2 * | 1/1999 | ......... F02D 41/0097 |
| DE | 102010041444 | A1 | 3/2012 | |
| EP | 2289748 | A1 * | 3/2011 | ............... B60T 8/885 |
| EP | 2657709 | A2 * | 10/2013 | ............ G01D 5/2457 |
| EP | 2289748 | B1 * | 10/2015 | ............... B60T 8/885 |
| EP | 2289748 | B9 * | 1/2016 | ............... B60T 8/885 |
| FR | 2740509 | A1 * | 4/1997 | ......... F02D 41/0097 |
| IN | 310333 | B | 6/2009 | |
| JP | 3685940 | B2 * | 8/2005 | ............... B60T 8/885 |
| JP | 4756410 | B2 * | 8/2011 | ............... G01D 3/08 |
| KR | 101511873 | B1 | 4/2015 | |
| WO | WO-9601980 | A1 * | 1/1996 | ......... F02D 41/0097 |
| WO | WO-9727488 | A1 * | 7/1997 | ............... B60T 8/171 |
| WO | WO-2022265951 | A1 * | 12/2022 | ............ B60W 40/10 |

* cited by examiner

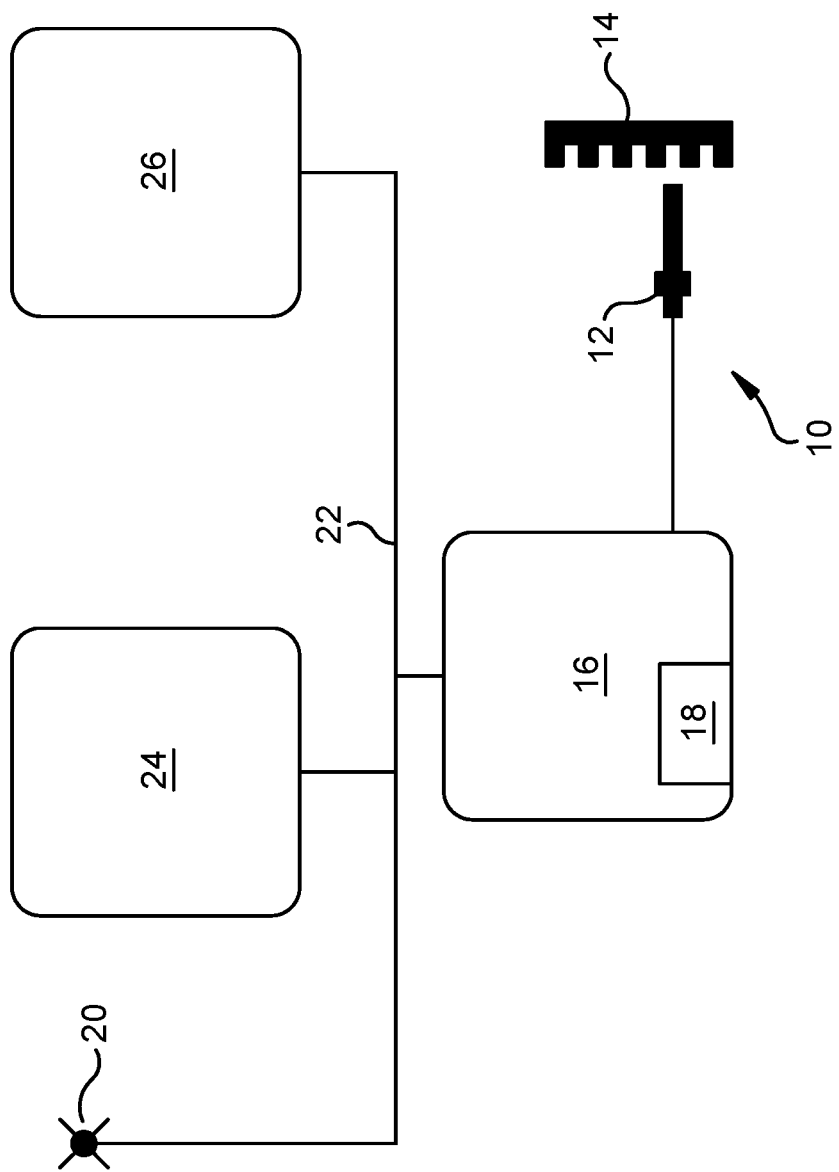

DIRECTION DETECTION USING A WHEEL SPEED SENSOR AND EXCITER RING

BACKGROUND

The present application relates to a system and method for using wheel speed sensor signals in vehicle direction detection.

Wheel speed sensors are used in commercial vehicle air brake systems for antilock braking and stability control. Wheel speed sensors transmit a signal in relation to a rotating exciter ring. The exciter ring is made of several metal teeth that are sensed by the wheel speed sensor to indicate the speed of the vehicle. Because of the location of the exciter ring at the wheel end, it can be subject to debris and corrosion. Broken or missing teeth on the exciter ring can cause incorrect readings. If no wheel speed sensor signal is present, errors will be flagged, and the control systems may not operate.

In some situations, it is valuable to know the direction the vehicle is moving. Not all commercial vehicles are equipped with automatic transmissions that transmit vehicle direction on a vehicle communication bus. In addition, a vehicle transmission may be in neutral, but still moving backward due to positioning of the vehicle on an incline. Using the wheel speed sensor and exciter ring to determine direction as well as speed is useful in these situations. Accordingly, those skilled in the art continue with research and development efforts in the field of vehicle system design to improve methods to determine vehicle direction using wheel speed sensors and exciter rings.

SUMMARY

In accordance with one embodiment, a direction detection system for a commercial vehicle comprises at least one active wheel speed sensor (aWSS) for transmitting signals, an exciter ring having teeth for inducing a change in the signals from the aWSS and a controller having control logic. The control logic receives a first series of signals from the aWSS, compares the first series of signals to an array of predefined signals and determines the direction of travel of the vehicle based on the first series of signals from the aWSS matching the array of predefined signals. The control logic then receives a second series of signals from the aWSS and determines that the exciter ring has at least one anomaly in response to at least one signal in the second series of signals having a first variance. The control logic updates the array of predefined signals to include a representation of the first variance to create an array of updated signals and determines the direction of travel of the vehicle based on a subsequent series of signals matching one of the array of predefined signals and the array of updated signals.

In accordance with another embodiment, a method for detecting the direction of a commercial vehicle using a wheel speed sensor includes receiving a first series of signals from the aWSS, comparing the first series of signals to an array of predefined signals and determining the direction of travel of the vehicle based on the first series of signals from the aWSS matching the array of predefined signals. The method further includes receiving a second series of signals from the aWSS and determining that the exciter ring has at least one anomaly in response to at least one signal in the second series of signals having a first variance. The method further includes updating the array of predefined signals to include a representation of the first variance to create an array of updated signals and determining the direction of travel of the vehicle based on a subsequent series of signals matching one of the array of predefined signals and the array of updated signals.

BRIEF DESCRIPTION OF THE DRAWINGS

FIG. 1 is a representation of the direction detection system.

DETAILED DESCRIPTION

Figure 2A:
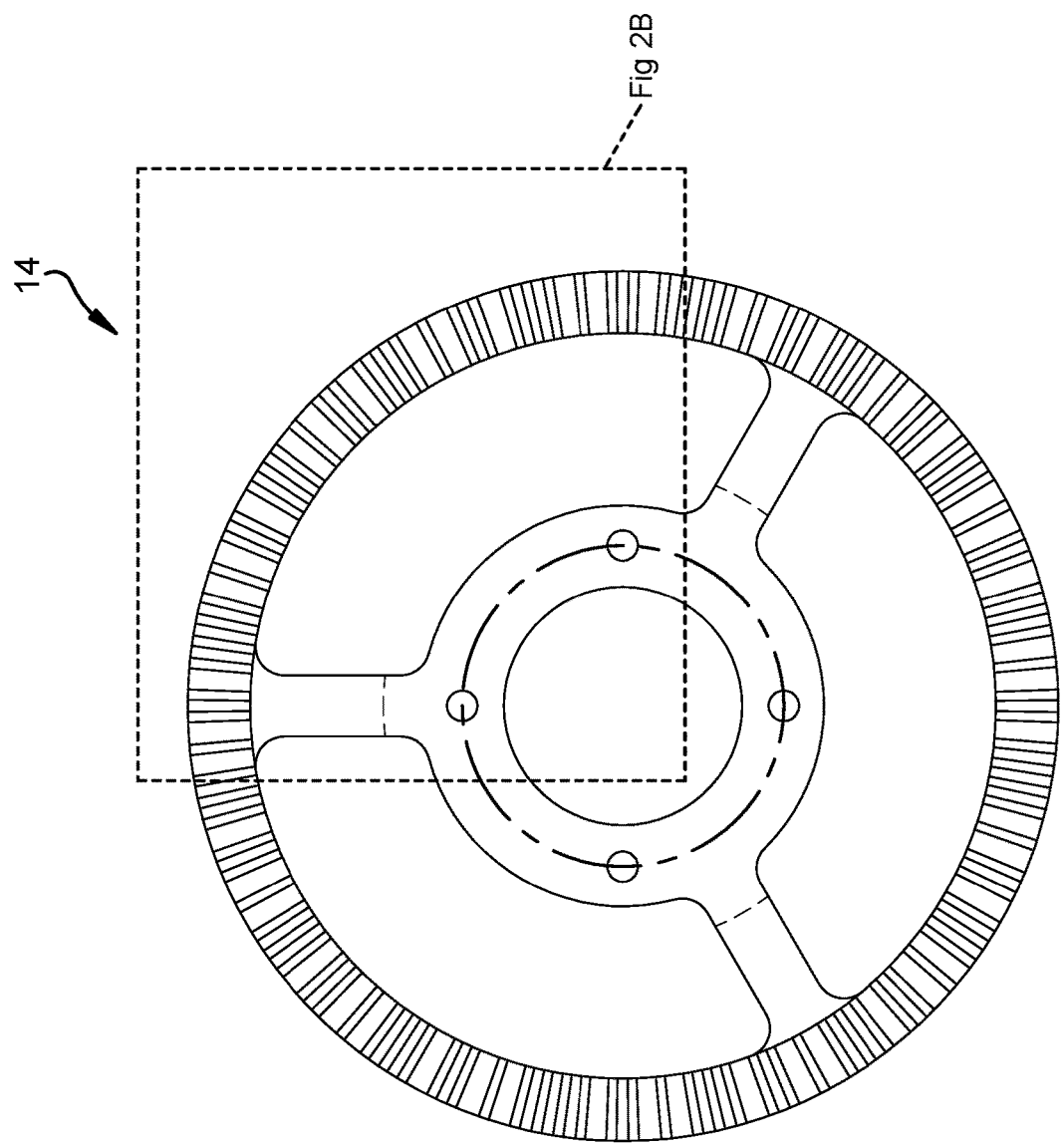
FIGS. 2A and 2B are a representation of an exciter ring for use in the direction detection system.

Referring to FIG. 1, a vehicle direction detection system 10 is illustrated. An active wheel speed sensor (aWSS) 12 is part of the direction detection system 10. In general, a vehicle includes at least two active wheel speed sensors, but may have four, six or more if an active wheel speed sensor is installed on every wheel end of the vehicle. For the vehicle direction detection system 10, a single aWSS 12 could be monitored. In general, four or six active wheel speed sensors are monitored, especially in a tractor based system.

The aWSS 12 may use the principles of magnetic reluctance, Hall Effect, or other type of sensing to determine that an exciter ring 14 is moving relative to the aWSS 12. In one example, the aWSS 12 includes a single sensing element measuring the magnetic reluctance effect. In another example, a second sensing element may be used to reduce signal noise, but the second sensing element would not be used in the direction detection function. The aWSS 12 communicates wheel speed signals and other information via wire or wirelessly to a controller 16.

For each active wheel speed sensor on the vehicle, there is a corresponding exciter ring 14 installed on the moving portion of the wheel end. The aWSS 12 is mounted on a non-rotating portion of the wheel end adjacent to the exciter ring 14. The exciter ring 14 may include uniform width teeth around the outer circumference or may include teeth of different widths in a repeating pattern. The output of the aWSS 12 varies in response to excitation by the teeth of the exciter ring 14 as the teeth move past the aWSS 12. The output varies in frequency and/or amplitude based on the pattern of teeth.

The controller 16 includes a processor having control logic 18. The control logic 18 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 18. The memory of the control logic 18 is pre-programmed with at least one predefined array of wheel speed sensor signals. The wheel speed sensor signals are correlated with the pattern of teeth on the exciter ring 14. Therefore, if the exciter ring 14 tooth pattern is changed, the at least one predefined array of wheel speed sensor signals as stored in memory must be changed as well.

When vehicle power is on, the control logic 18 receives a digital signal from the aWSS 12. Changes in the digital signal are induced by the exciter ring 14. The frequency of the digital signal corresponds to a speed of the vehicle. A series of signals are transmitted by the aWSS 12, even at zero speed.

The controller 16 communicates on a vehicle communications bus 22 with other controllers. The communications bus 22 may use a standardized format, such as SAE J1939. Other controllers may include, for example, a stand-alone brake controller 24 for implementing antilock braking (ABS) or stability (ESP) control, if the braking functions are not included in controller 16. A display 26 may be connected to the communications bus 22. An indicator 20, such as a lamp, may also be connected to the communications bus 22 for indicating warnings or faults in any vehicle system. Other vehicle controllers, such as an engine controller or a transmission controller (not shown), may also communicate information on the communications bus 22. The information available on the communications bus 22 may include vehicle operating parameters, such as engine speed.

The controller 16 will output the vehicle speed and the direction of the vehicle, either forward or backward, on the communications bus 22 for use by the other controllers. Other systems that rely on the direction detection system 10 can include an autonomous yard maneuvering system and a hill start assist system. The display 26 may show the driver of the vehicle the direction of the vehicle.

If the direction detection system 10 determines the vehicle is moving in reverse but the vehicle transmission state is in neutral or park, the driver should be alerted. The indicator 20 may be illuminated if there is an error in the system. If there is an error in the direction detection system 10, other vehicle systems may not operate, such as the yard maneuvering system.

Therefore, a system for determining vehicle direction includes at least one active wheel speed sensor (aWSS) for transmitting signals, an exciter ring having teeth for inducing a change in the signals from the aWSS and a controller having control logic. The control logic receives a first series of signals from the aWSS, compares the first series of signals to an array of predefined signals and determines the direction of travel of the vehicle based on the first series of signals from the aWSS matching the array of predefined signals. The control logic then receives a second series of signals from the aWSS and determines that the exciter ring has at least one anomaly in response to at least one signal in the second series of signals having a first variance. The control logic updates the array of predefined signals to include a representation of the first variance to create an array of updated signals and determines the direction of travel of the vehicle based on a subsequent series of signals matching one of the array of predefined signals and the array of updated signals.

FIG. 2A shows the exciter ring 14 according to one example. The exciter ring 14 is formed from a metallic material with low magnetic reluctance and high magnetic permeability, such as ferritic stainless steel, annealed martensitic stainless steel, carbon steel and iron. The exciter ring 14 includes one hundred teeth in a repeating pattern around the circumference of the exciter ring 14. The exciter ring 14 is cast, machined or laser cut to form the teeth. Other numbers of teeth on the exciter ring are contemplated.

Figure 2B:
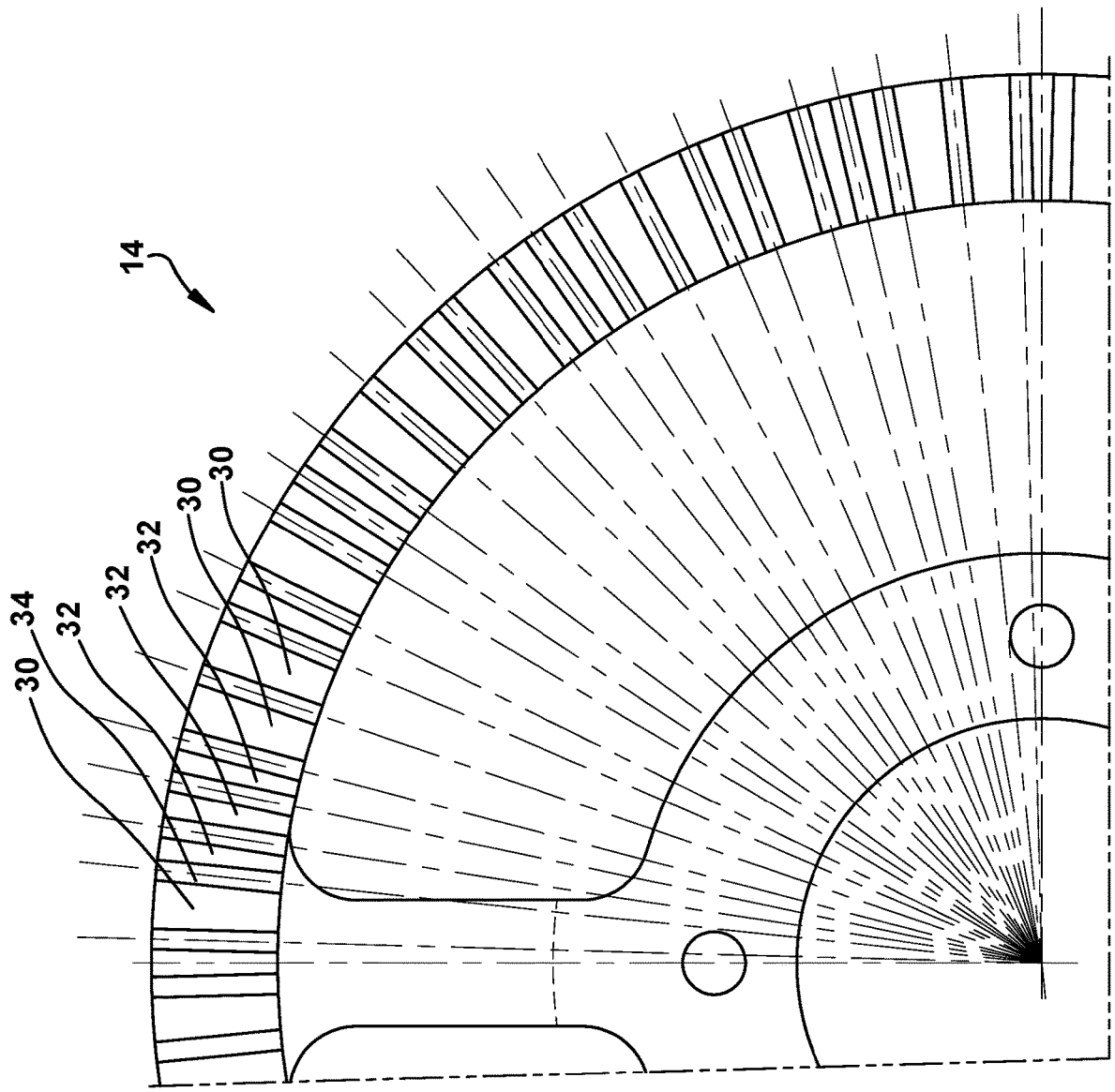

An expanded view of approximately a quarter of exciter ring 14 is shown in FIG. 2B. The repeating pattern is shown with two types of teeth, a wide tooth 30 and a narrow tooth 32. Prior art exciter rings generally include teeth of all the same width. In one example, the repeating pattern of teeth includes a first tooth having a first width (the wide tooth 30) and a second tooth having a second width (the narrow tooth 32) separated by a gap 34. The second width of the second tooth is less than the first width of the first tooth. In FIG. 2B, a wide tooth 30 begins the pattern. In the example shown, the wide tooth 30 is followed by three narrow teeth 32, 32, 32. Two wide teeth 30, 30 are followed by one narrow tooth 32. A wide tooth 30 and two narrow teeth 32, 32 continue the pattern. Two wide teeth 30, 30 a narrow tooth 32 then another wide tooth 30 follow. Two narrow teeth 32, 32 are followed by two wide teeth 30, 30. A narrow tooth 32 and a wide tooth 30 are followed by two narrow teeth 32, 32 and two wide teeth 30, 30 and a final narrow tooth 32 to complete the pattern. This pattern of twenty five teeth is repeated four times around the circumference of the exciter ring 14. The pattern as shown is specifically designed to implement the direction capability of this invention. However, other patterns are contemplated.

Each tooth is separated by the gap 34. The gap 34 is the same width between every tooth. In another embodiment, the tooth size can remain the same and the width of each gap can be varied to create the pattern. In yet another embodiment, both the tooth width and the gap width can be varied to create the pattern.

The exciter ring 14 can be designed with teeth having more than two different widths as well. The number of teeth of different widths that are made part of the pattern will affect how many teeth are required to be read to determine the vehicle direction, as will be explained. Two to four different types of teeth are recommended.

The wheel speed sensor signal output expected from the exact pattern of teeth on the exciter ring 14 is programmed as the predefined array of wheel speed signals into the memory of the control logic 18.

Figure 3A:
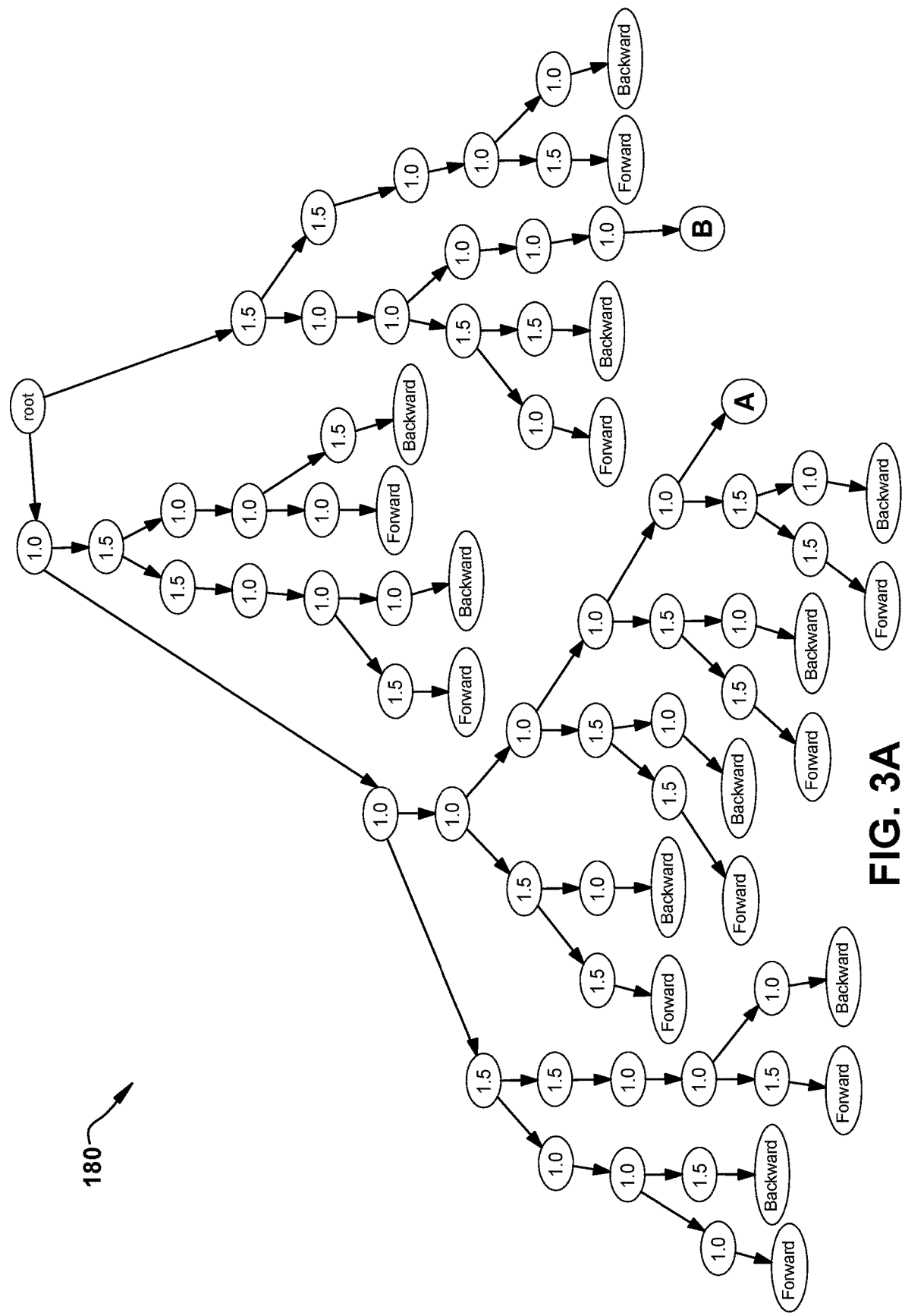
FIGS. 3A-3C are a representation of a decision tree used in determining vehicle direction having an exciter ring of FIGS. 2A and 2B.
Figure 3B:
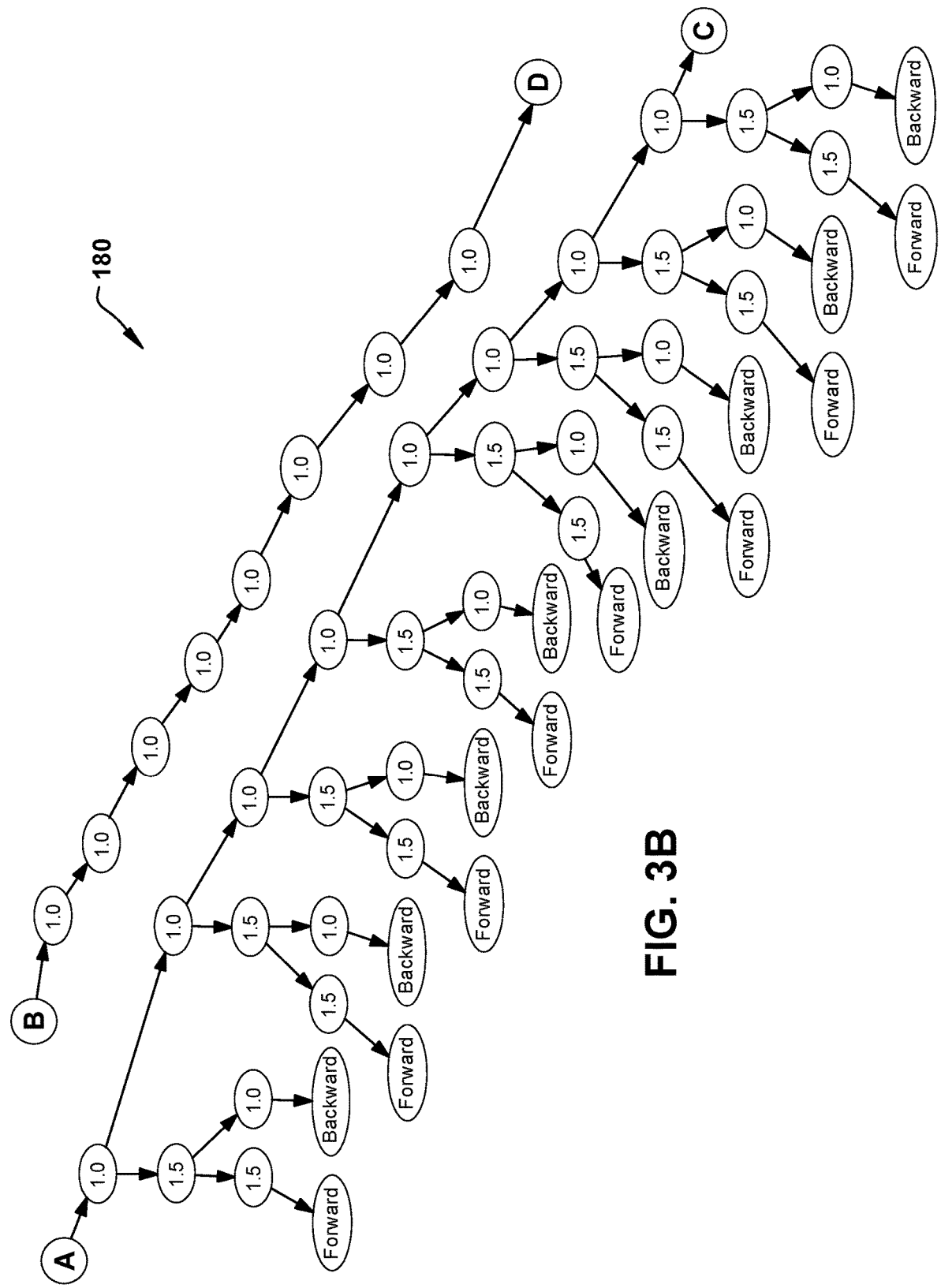
Figure 3C:
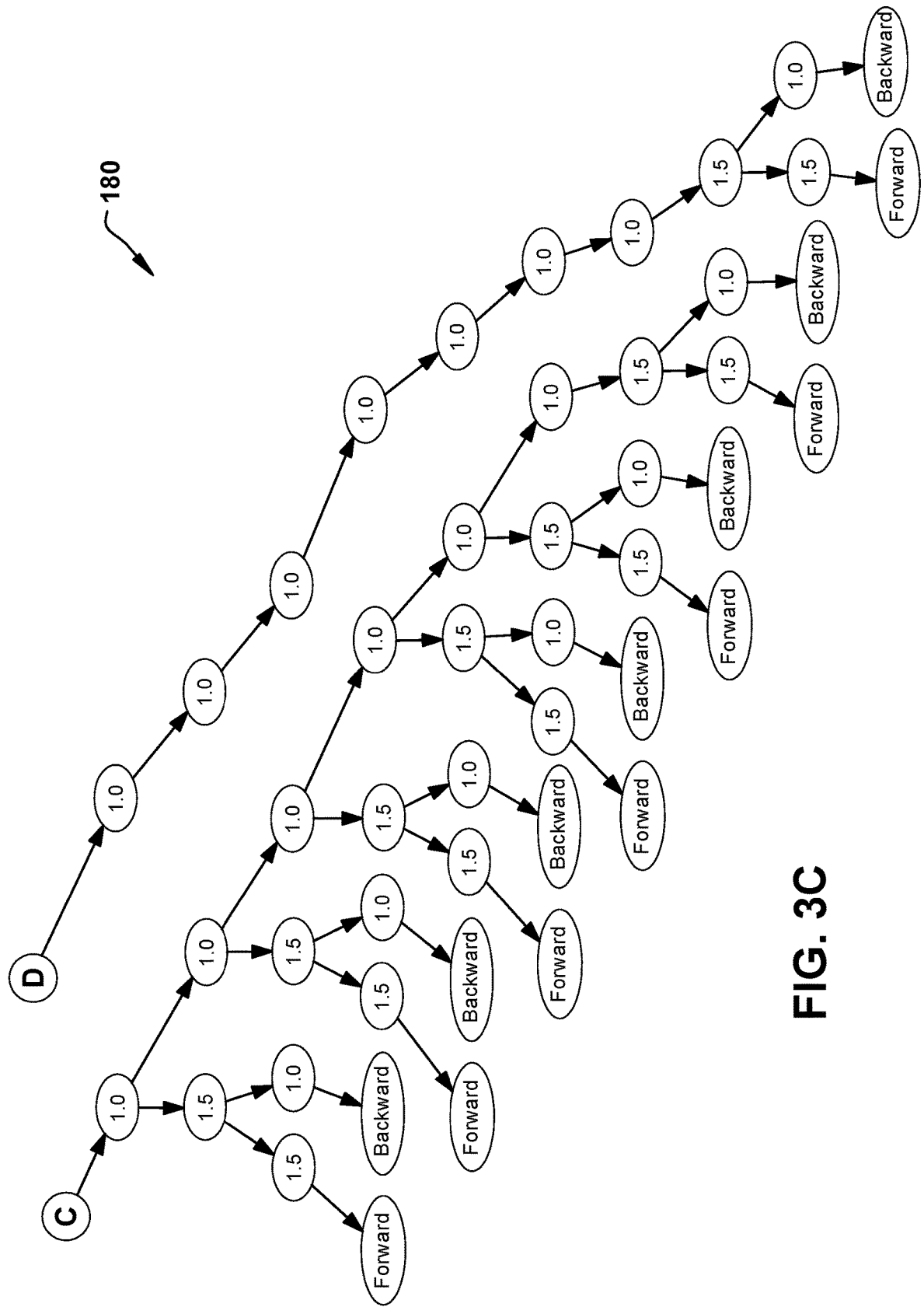

FIG. 3 is a predefined decision tree 180 for two types of teeth in a pattern as shown in FIG. 2B. The narrow tooth is defined as having a width of 1.0 and the wider tooth as having a width of 1.5. From the root, the control logic 18 determines which path to follow based on whether the control logic 18 identified a narrow tooth 1.0 or wide tooth 1.5. The control logic 18 stays on the selected path until it reaches the terminal decision state of "Forward" or "Backward". If more tooth widths were used from the root stage, the decision tree 180 would have fewer nodes (i.e. fewer teeth would need to be evaluated) before a direction detection decision is made. For example, with a three different teeth pattern on the exciter ring 14, the average requirement is to only read two teeth before interpreting the direction of the vehicle. However, the resolution of the aWSS signal must be considered, as there must be sufficient difference in each of the teeth to allow the control logic 18 to distinguish the variation consistently. Manufacturing of the exciter ring 14 can also be complicated by having many different varieties of teeth widths. Therefore, an exciter ring tooth pattern with either two or three different types of teeth is preferred.

Figure 4A:
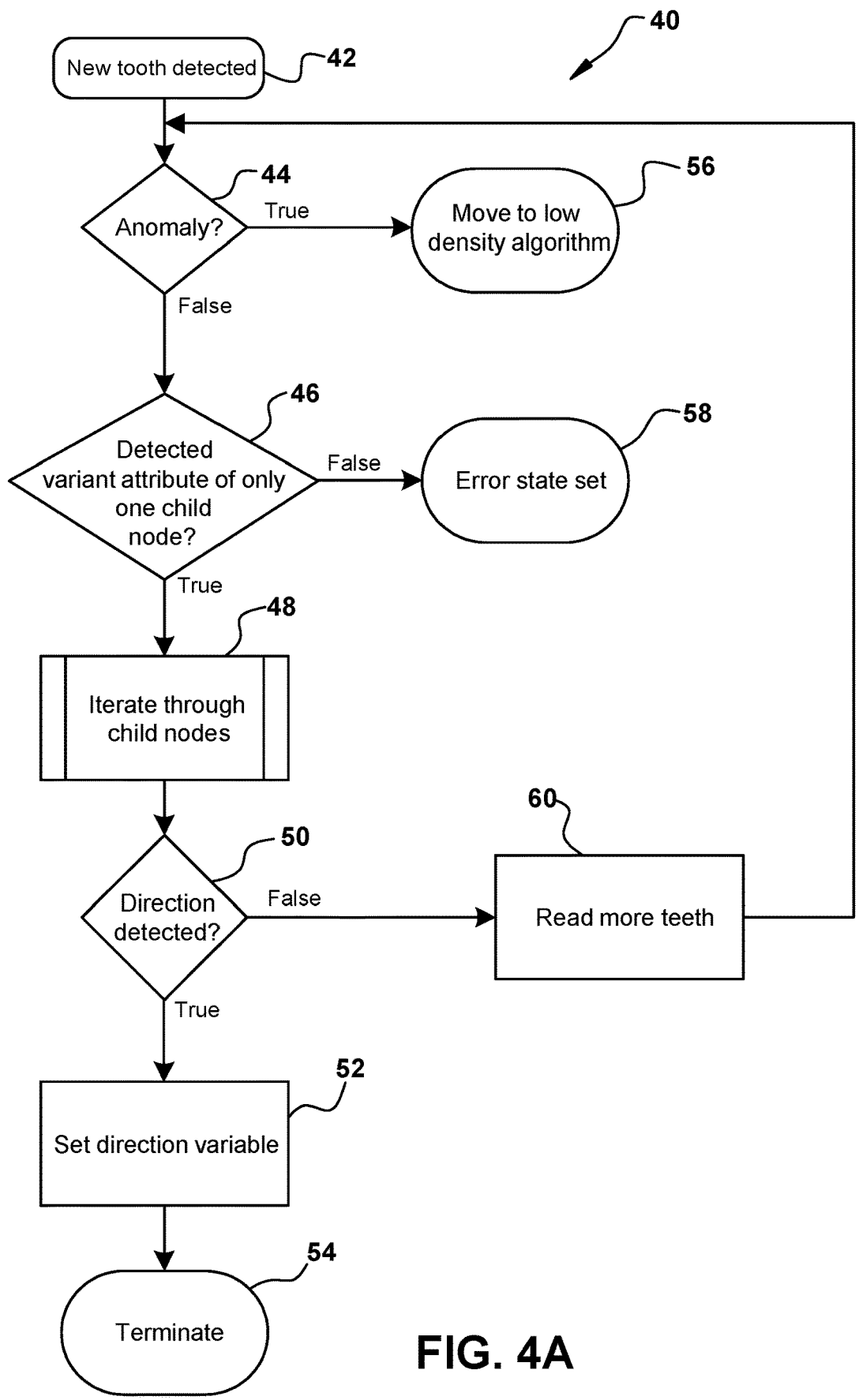
FIGS. 4A-4D are representations of a method of determining vehicle direction.

FIG. 4A shows a method 40 of determining a direction of a vehicle using the direction detection system 10 of the present invention. The exciter ring 14 has two different teeth of two different widths in a predetermined pattern, as shown in FIG. 2B. The algorithm for direction detection is run on startup of the vehicle and until the direction is determined. In another example, the direction detection can be run continuously.

The control logic 18 may manage a confidence level in the operation of various functions of the vehicle that rely on the direction detection algorithm and the accuracy of reading the exciter rings. If anomalous teeth are identified frequently, then the operation of the ABS system may be affected if speed cannot be accurately determined, for example. Knowledge of the state of the exciter ring is helpful in ensuring proper operation of many functions of the vehicle. In another example, autonomous functions such as yard maneuvering needs high accuracy of teeth counting for distance functions. Even if two are three teeth of an exciter ring are missing or broken, distance calculation is detrimentally affected. When the system is initialized during a first cycle through the algorithm, the confidence level in the robustness of the exciter ring 14 is high.

In step 42, a tooth is detected by the control logic 18. The type of tooth, wide tooth 30 or narrow tooth 32, is recorded. The control logic 18 differentiates the two types of teeth because the length of the signal output from the aWSS 12 changes.

In step 44, the control logic 18 determines whether the detected tooth has an anomaly. An anomaly could include a broken tooth, a missing tooth, a cracked tooth, the gap between the tooth filled with magnetic permeable material or other deformations of the teeth due to corrosion or damage to the exciter ring 14. An anomaly means that the control logic 18 cannot determine whether the tooth is a wide tooth 30 or narrow tooth 32 as the measured signal does not match either the narrow tooth or the wide tooth profile.

Figure 5:
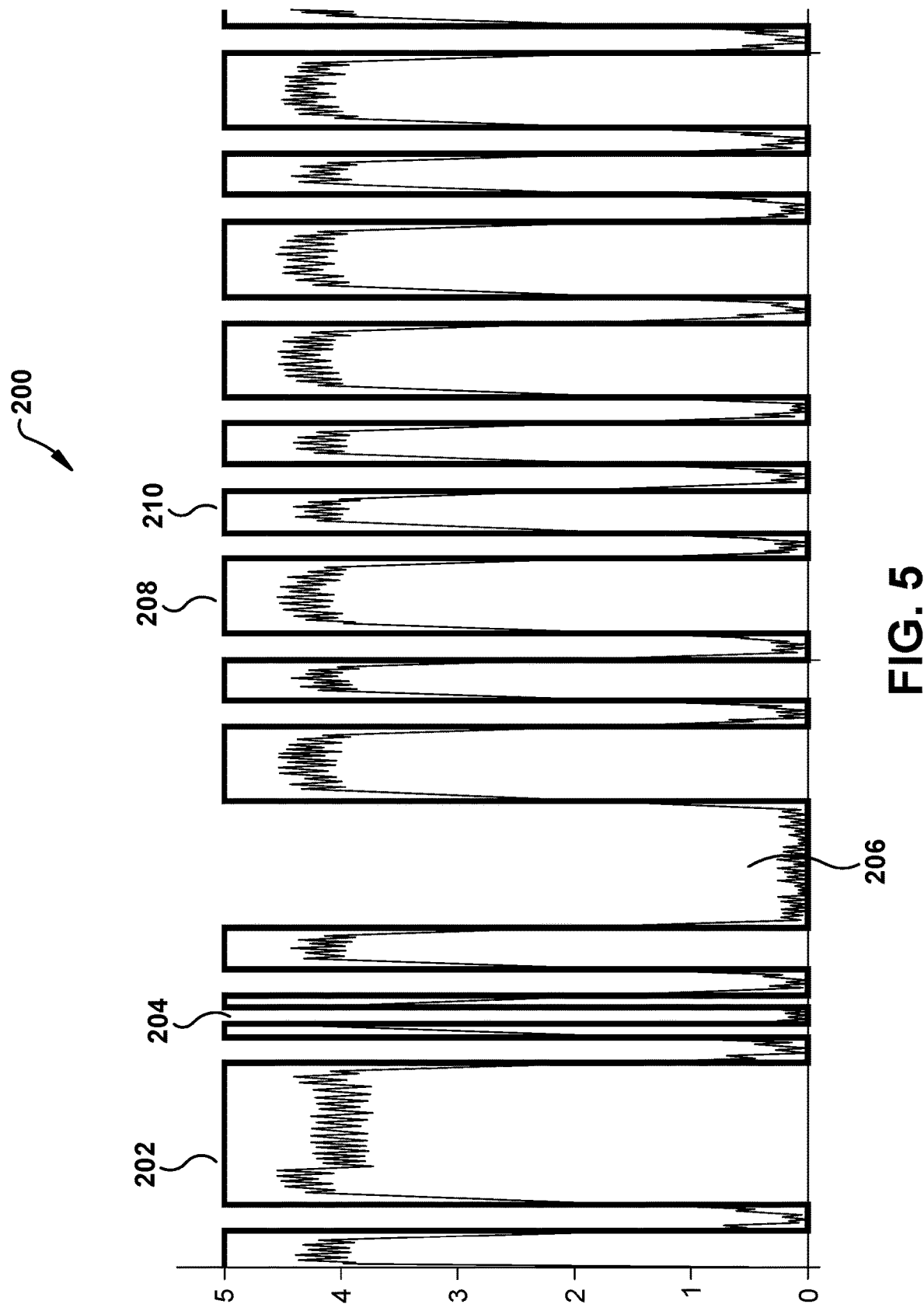
FIG. 5 is a representation of signal output on an exciter ring having anomalous teeth.

FIG. 5 depicts several types of signals that may be considered normal or anomalous. The signal 200 is shown as a series of digital signals from an aWSS 12. Output signal 208 is interpreted by the control logic 18 as a normal wide tooth and represented by 1.5 in the array. Output signal 210 is interpreted by the control logic 18 as a normal narrow tooth and represented by 1.0 in the array. Output signal 202 represents a section of the exciter ring 14 where the gap 34 between teeth may be filled with a magnetic permeable material such that the signal is longer than a normal wide tooth signal 208. Output signal 204 represents a section of the exciter ring 14 where a tooth is split in the middle such that the output signal does not match the normal narrow tooth signal 210. Output signal 206 represents a section of the exciter ring 14 where a tooth is completely missing such that the output signal remains zero for a longer period of time than is expected by the control logic 18. These anomalies are categorized by the control logic 18 as different variances and will have different representations in an array, as will be explained.

Returning to FIG. 4A, if the control logic 18 determines that the signal received while reading the tooth is anomalous, the method 40 continues to step 56 to begin a method 70 (shown in FIG. 4B) incorporating a low density of anomalous teeth to determine vehicle direction. The time at which the anomaly occurs is recorded in memory so that the user can learn at what time the potential damage to the exciter ring 14 occurred.

If the control logic 18 determines that the tooth signal as read meets the expected pattern, the method 40 continues to step 46. The decision tree 180 is set up as multiple nodes in the memory of the control logic 18, where each node includes a path to direction detection, as shown in FIG. 3. In step 46, the control logic 18 determines whether the tooth signal as detected is the next one in one of the paths, thereby is an attribute of only one child node. In FIG. 3, a narrow tooth is represented as 1.0 and a wide tooth is represented as 1.5, but other representations can be used.

If the tooth signal shape as detected does not follow as one of the paths as shown in FIG. 3 and no anomaly was detected in 44, then an error state is set in step 58 and the method 40 stops. The indicator 20 may be illuminated. The control logic 18 may send an error message on the communications bus 22 so that the other controllers know the direction detection algorithm is no longer active.

If the tooth signal as detected follows one of the paths of an array in the decision tree 180, the method 40 continues to step 48. In step 48, the control logic 18 reads the signals to iterate through a path based on the subsequent signal (e.g. a wide tooth 1.5 or a narrow tooth 1.0). In step 50, the direction is detected if enough nodes in a path are identified according to the decision tree 180 in FIG. 3.

If the direction cannot be determined yet, the method moves to step 60 to read more teeth. The method 40 first returns to step 44 to determine if the next signal is anomalous before continuing to iterate.

If enough teeth signals are assigned into nodes and the path reaches a completed direction in step 50, the method 40 sets the direction variable (forward or backward) in the control logic 18 in step 52. In step 54, the direction detection method 40 is ended.

Figure 4B:
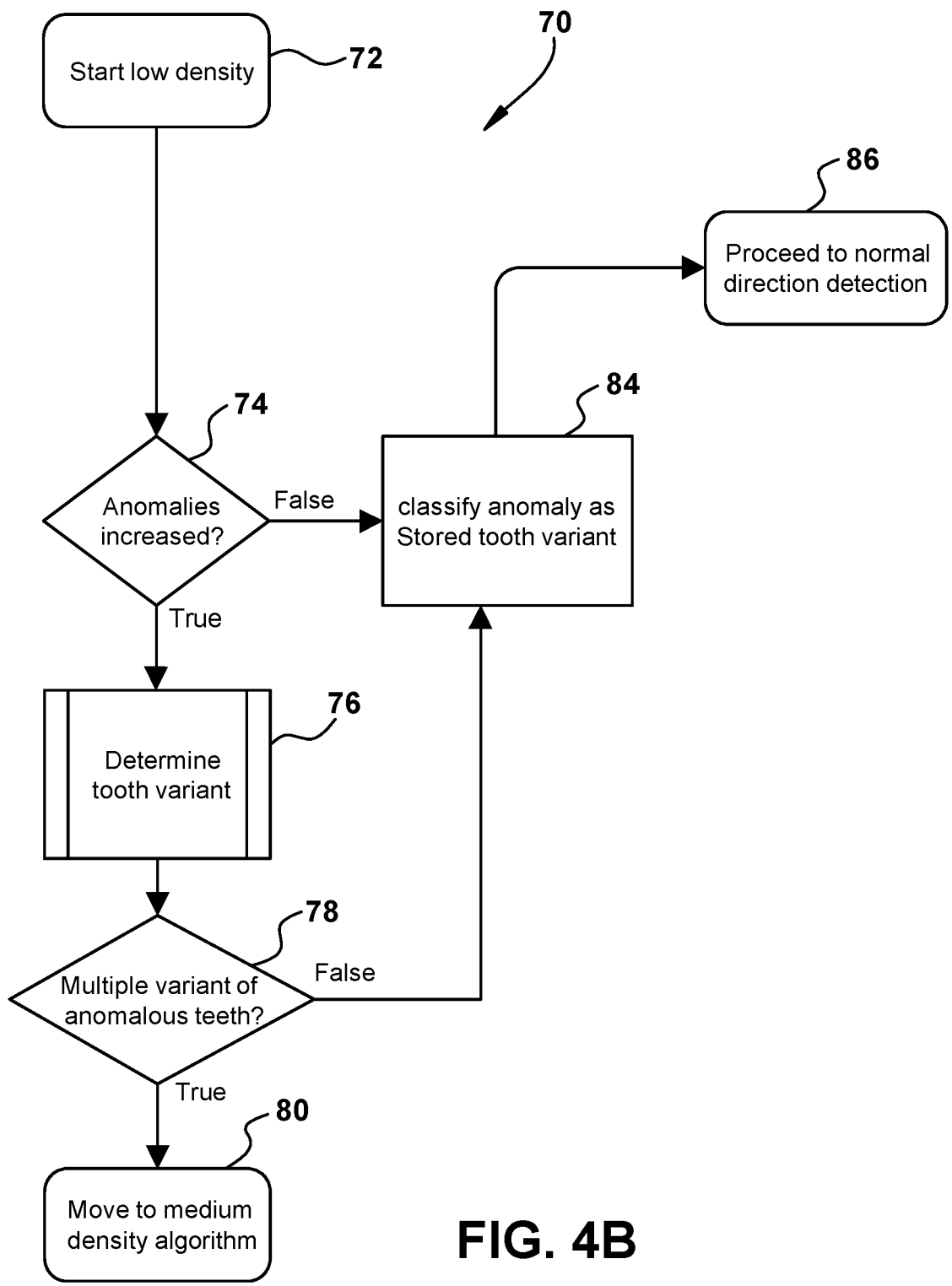

FIG. 4B shows method 70 of determining direction detection from a low density status of anomalous teeth. In step 72, the method 70 begins.

In step 74, it is determined if there is more than one anomalous tooth. If there are no additional anomalous teeth, the method 70 continues to step 84 where the anomalous tooth is stored as a tooth variant. The anomalous tooth type can be either inferred using the surrounding pattern or the control logic 18 can interpret the signal. In other words, a very wide gap can mean that a wide tooth 30 is missing. However, if the signal appears as a split tooth, such as shown in signal 204, the control logic 18 can elect not to store it as a tooth variant. In one example, if there is only one identified anomalous tooth, the control logic 18 may elect to default to the method 40.

The method 70 then continues to step 86, where the normal direction detection method 40 is continued. An array within the decision tree 180 is updated to store the anomalous tooth as a new node. The updated array of signals is available in the memory for access by the control logic 18. For example, the anomalous tooth is added to the node pattern as a tooth identified as 2.0, but other arbitrary representations can be assigned as long as it is different than the wide tooth or narrow tooth identification.

If the number of anomalous teeth has increased, meaning more than a single anomaly has been identified in step 74, then the method 70 proceeds to step 76 to determine the variant. In step 78, the method 70 determines if there is more than one variant of anomalous teeth, meaning if the subsequent anomalous tooth causes a different wheel speed signal pattern than the prior detected anomalous tooth then it is a different tooth from tooth 2.0 and will be assigned a new identification. If there is more than one variant of recognized anomalous teeth, the method 70 proceeds to step 80 which begins method 100 on an algorithm for a medium density state of anomalous teeth as in FIG. 4C.

If there is not more than one variant of anomalous teeth, meaning the subsequent tooth creates the same wheel speed sensor signal output as the prior identified anomalous tooth, the method 70 proceeds to step 84 where the anomalous tooth is set as a variant and proceeds to step 86 to carry on the normal direction detection method 40. The confidence level in the exciter ring is set to medium. All functions are operational using this exciter ring with the modified decision set.

Figure 4C:
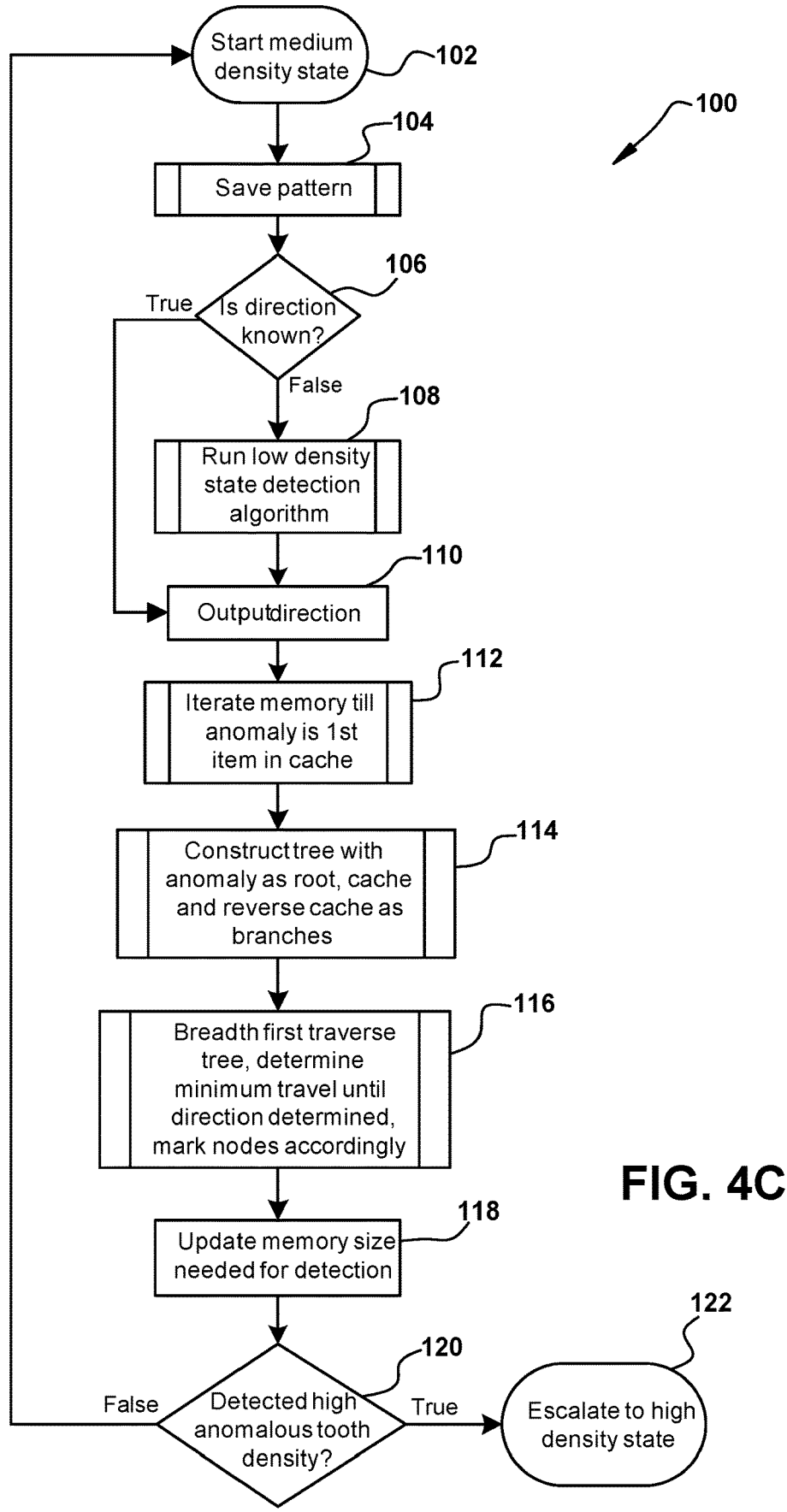

In FIG. 4C, the method 100 for analyzing a pattern in the exciter ring 14 in a medium density state begins in step 102. In step 104, the updated pattern is saved in a memory. In step 106, the control logic 18 determines if the vehicle direction is known already from a prior wheel speed sensor input. If true, the method 100 proceeds to step 110 to output direction. If the direction is not known, the method 100 proceeds to step 108 to run the low density state detection method 70.

In step 108, the low density state detection algorithm as in method 70 is run again until the direction is known. The direction is then output in step 110. In step 112, the pattern of known teeth is iterated until the anomaly is the first item in new pattern tree. In step 114, a tree, similar to the decision tree 180 in FIG. 3, is constructed with the anomalous tooth as the root. Each branch of the tree is an array.

In another example, the tree pattern is rebuilt after a recalibration event of the vehicle, such as a service event.

In step 116, the control logic 18 determines the minimum travel until direction is determined.

In step 118, the maximum cache size is updated as needed for determining direction detection.

In step 120, the control logic determines if high anomalous tooth density is detected. If there is another exciter ring tooth having an anomaly in such close proximity to already identified anomalous tooth that the direction cannot be detected, this situation is considered a high anomalous tooth density. A new branch of the tree must be built from each newly detected anomalous tooth and a high anomalous tooth density is detected when that branch must be built from a branch that originated from an anomalous tooth. In another example, when the total number of anomalous teeth detected exceeds a predetermined limit, such as a total of four anomalous teeth throughout the exciter ring, a high anomalous tooth density is determined. If the high anomalous tooth density is determined, then the method 100 proceeds to step 122 to start high density state method 140 as in FIG. 4D. If false, then method 100 returns back to step 102 to continue to run the medium density state algorithm 100. The confidence level remains at medium.

Figure 4D:
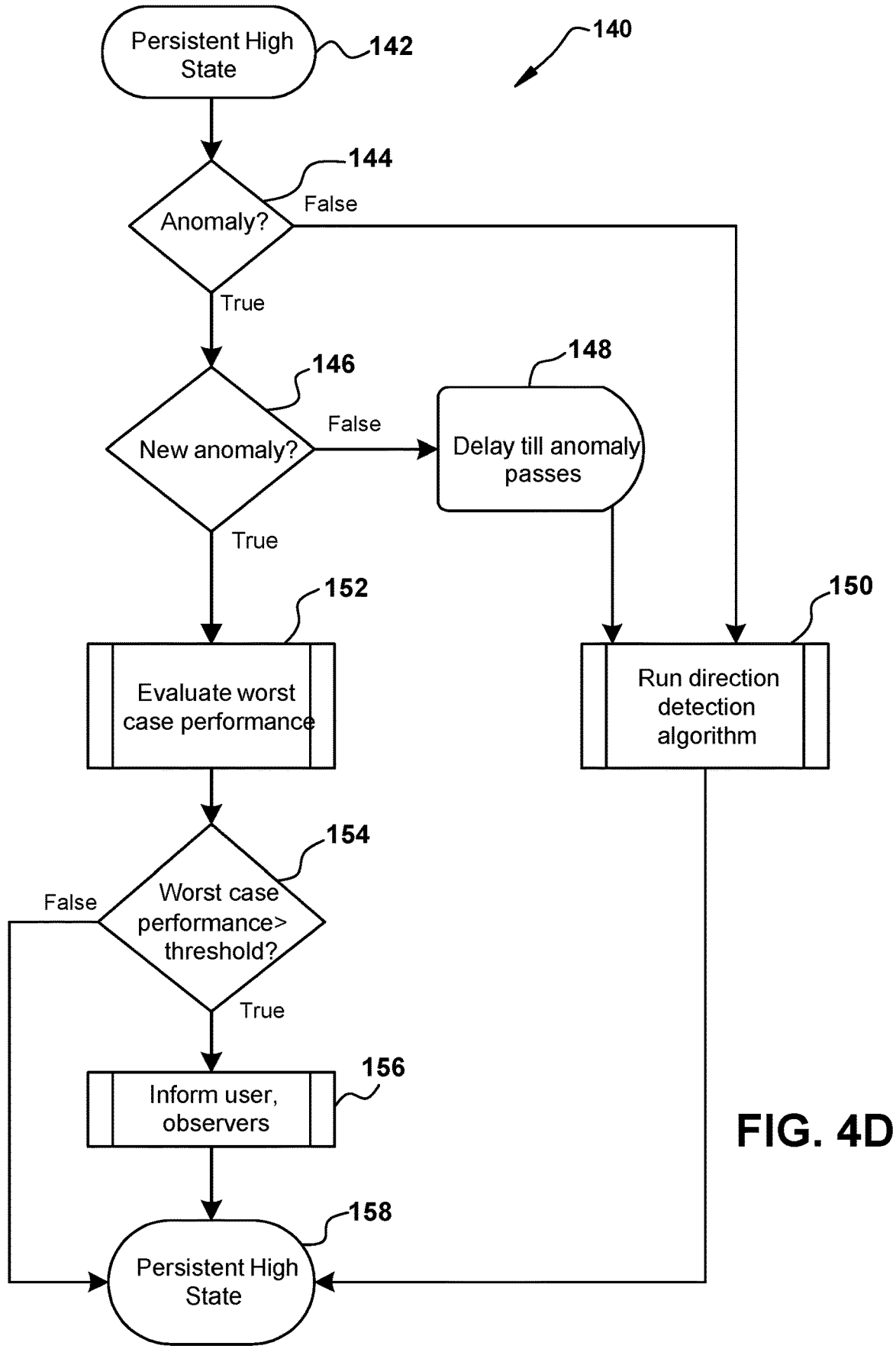

In FIG. 4D, the method 140 showing the high density algorithm is shown. In step 142 the high density algorithm begins. In step 144, the control logic 18 determines if another anomalous tooth is detected. If false, the method 140 continues to step 150. If true, the method 140 continues to step 146 to determine if it is an anomalous tooth variant that has already been detected. If the anomalous tooth type has not already been detected, the method continues to step 148.

If it is not a new type of anomalous tooth, the method 140 continues to step 148 to wait until the anomalous tooth has passed. In step 150, the direction detection algorithm 40 is run again to determine direction, but the direction detection may not be reliable until the pattern reads successive non-anomalous teeth.

In step 152 the worst case performance of the exciter ring is evaluated by the control logic 18. If the worst case performance is greater than a threshold in step 154 then the driver is warned in step 156. For example, the indicator 20 can be illuminated or a message sent to display 26 so that the user knows that the exciter ring 14 should be replaced. If the worst case performance is less than the threshold, then the persistent high state is set in 158. If no direction detection can be reliably be detected in step 150, the system informs user and the confidence level is set at low. Autonomous driving and direction detection are likely disabled. The exciter ring 14 should be replaced.

When the exciter ring 14 is replaced with an identical new exciter ring, the control logic 18 may eliminate the updated array from memory. The control logic 18 can learn that a new exciter ring has been installed based on several rotations of the new exciter ring not exhibiting the anomaly. Alternatively, a method may be available to the user to send a program indication to the control logic 18 upon installation of the new exciter ring.

Therefore, a method for detecting the direction of a commercial vehicle using a wheel speed sensor includes receiving a first series of signals from the aWSS, comparing the first series of signals to an array of predefined signals and determining the direction of travel of the vehicle based on the first series of signals from the aWSS matching the array of predefined signals. The method further includes receiving a second series of signals from the aWSS and determining that the exciter ring has at least one anomaly in response to at least one signal in the second series of signals having a first variance. The method further includes updating the array of predefined signals to include a representation of the first variance to create an array of updated signals and determining the direction of travel of the vehicle based on a subsequent series of signals matching one of the array of predefined signals and the array of updated signals.

Figure 6:
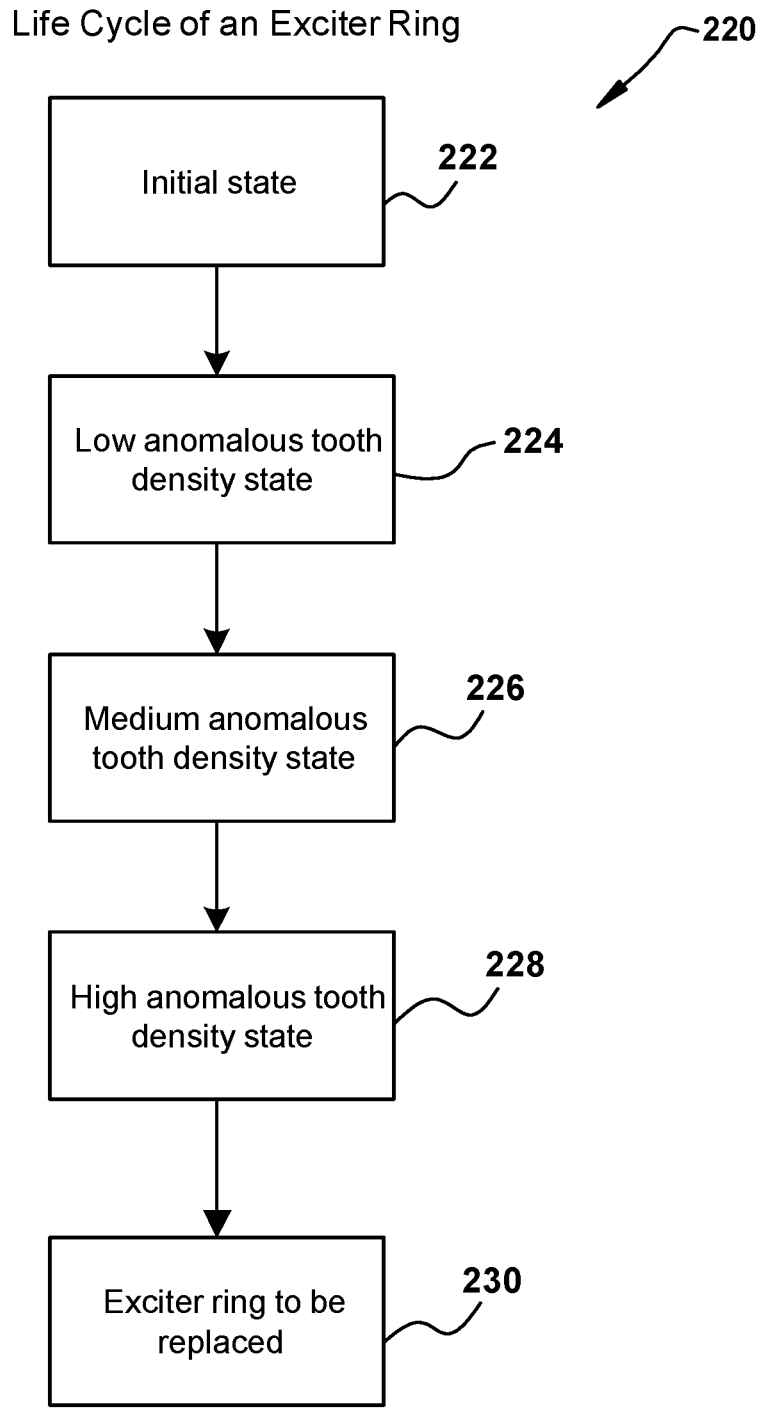
FIG. 6 is a representation of the life cycle of an exciter ring.

In FIG. 6, the life cycle 220 of an exciter ring is shown. In the initial state 222, there are no anomalous teeth on the exciter ring. The performance of the exciter ring is known, and therefore the confidence level is high. The method 40 is run to determine direction. In the low anomalous tooth density state 224, there is only one anomalous tooth or if there are multiple anomalous teeth, the anomaly is all in the same manner. The confidence level is reduced but operation is acceptable for all uses. The method 70 is run to determine direction. The exciter ring performance is predictable and there is no performance impact once the anomalous teeth are detected and assimilated into the performance.

In the medium anomalous tooth density state 206, there are multiple anomalous teeth of different variations. There is some performance impact as anomalous teeth constitute additional edges for the algorithm to interpret. The direction detection algorithm 100 is run to determine direction.

In the high density anomalous tooth state 208, there are a significant number of anomalous teeth and/or anomalous teeth are in close proximity to each other. There is performance degradation. The direction detection algorithm 140 is still running but the direction may take longer to detect. A segment of the exciter ring 14 having no anomalous teeth is required to be registered by the control logic 18 before direction is reliably detected.

In state 210, the exciter ring is to be replaced because of the performance degradation and multiple errors. Direction detection can function when one exciter ring does not have a high or medium confidence level, but ABS and ESP functions require all of the exciter rings to be at the high or medium confidence level.

Therefore, this direction detection system 10 is usable even when there may be degradation to the exciter ring over time, such as destruction to the exciter ring teeth. The condition of the exciter ring 14 can be inferred based on the number of anomalies in the exciter ring 14 and/or the confidence level setting.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A direction detection system for a commercial vehicle comprising:
   at least one active wheel speed sensor (aWSS) for transmitting signals;
   an exciter ring having teeth for inducing a change in the signals from the aWSS; and
   a controller having control logic, wherein the control logic:
      receives a first series of signals from the aWSS,
      compares the first series of signals to an array of predefined signals,
      determines the direction of travel of the vehicle based on the first series of signals from the aWSS matching the array of predefined signals;
      receives a second series of signals from the aWSS;
      determines that the exciter ring has at least one anomaly in response to at least one signal in the second series of signals having a first variance;
      updates the array of predefined signals to include a representation of the first variance to create an array of updated signals; and
      determines the direction of travel of the vehicle based on a subsequent series of signals matching one of the array of predefined signals and the array of updated signals.

2. The direction detection system as in claim 1, wherein the control logic further:
   receives a subsequent series of signals from the aWSS;
   determines that the exciter ring has at least two anomalies in response to receiving a signal having a second variance; and
   updates the array of updated signals to include a representation of the second variance.

3. The direction detection system as in claim 1, wherein the control logic further infers the condition of the exciter ring based on the number of anomalies in the exciter ring.

4. The direction detection system as in claim 1, wherein the control logic further eliminates the array of updated signals in response to the exciter ring being replaced.

5. The direction detection system as in claim 1, wherein the control logic further updates a confidence level in response to the control logic creating the array of updated signals.

6. The direction detection system as in claim 5, wherein the control logic further indicates to a user that the exciter ring should be replaced based the confidence level.

7. The direction detection system as in claim 1, wherein the aWSS includes a single element Hall Effect sensor.

8. The direction detection system as in claim 1, wherein the exciter ring has a repeating pattern of teeth of different widths.

9. The direction detection system as in claim 8, wherein the repeating pattern of teeth comprises a pattern of a tooth of a first width and a tooth of a second width, wherein the second width is wider than the first width.

10. The direction detection system as in claim 1, wherein the control logic further records the time at which the anomaly is detected for use by the user in determining when the anomaly occurred.

11. A method for detecting the direction of a commercial vehicle using a wheel speed sensor comprising:
   receiving a first series of signals from the aWSS,
   comparing the first series of signals to an array of predefined signals,
   determining the direction of travel of the vehicle based on the first series of signals from the aWSS matching the array of predefined signals;
   receiving a second series of signals from the aWSS;
   determining that the exciter ring has at least one anomaly in response to at least one signal in the second series of signals having a first variance;
   updating the array of predefined signals to include a representation of the first variance to create an array of updated signals; and
   determining the direction of travel of the vehicle based on a subsequent series of signals matching one of the array of predefined signals and the array of updated signals.

12. The method as in claim 11, further comprising:
   receiving a subsequent series of signals from the aWSS;
   determining that the exciter ring has at least two anomalies in response to receiving a signal having a second variance; and
   updating the array of updated signals to include a representation of the second variance.

13. The method as in claim 11, further comprising inferring the condition of the exciter ring based on the number of anomalies in the exciter ring.

14. The method as in claim 11, further comprising eliminating the array of updated signals in response to the exciter ring being replaced.

15. The method as in claim 11, further comprising updating a confidence level in response to the control logic creating the array of updated signals.

16. The method as in claim 15, further comprising indicating to a user that the exciter ring should be replaced based the confidence level.

17. The method as in claim 11, further comprising recording the time at which the anomaly is detected for use by the user in determining when the anomaly occurred.

* * * * *